United States Patent [19]
Cummisford

[11] Patent Number: 5,387,453
[45] Date of Patent: Feb. 7, 1995

[54] LAP SEAL PACKAGING BAND

[76] Inventor: Robert G. Cummisford, 3260 Pleasant View Ct., Brookfield, Wis. 53045

[21] Appl. No.: 999,150

[22] Filed: Dec. 31, 1992

Related U.S. Application Data

[63] Continuation-in-part of Ser. No. 695,456, May 3, 1991, abandoned.

[51] Int. Cl.⁶ .............................................. B32B 7/12
[52] U.S. Cl. ..................... 428/77; 428/189; 428/194; 428/354; 24/DIG. 11
[58] Field of Search ............... 428/77, 189, 192, 194, 428/354, 343, 41; 24/DIG. 11

[56] References Cited
U.S. PATENT DOCUMENTS

| | | | |
|---|---|---|---|
| 3,035,957 | 5/1962 | Morgan | 428/41 |
| 4,582,737 | 4/1985 | Torgerson et al. | 428/57 |
| 4,751,108 | 6/1988 | Larimore et al. | 427/171 |
| 4,902,141 | 2/1990 | Liamswiel | 383/61 |

Primary Examiner—Alexander S. Thomas
Attorney, Agent, or Firm—Willis B. Swartwout, III

[57] ABSTRACT

A lap seal packaging band for wrapping or bundling objects. The band is formed from two overlying strips at least one of which is a non-woven material. The strips may be unequal or equal in length and at least one end of one strip is exposed. One or both of the strips are coated with a water borne pressure sensitive adhesive or both strips are coated with a water borne pressure sensitive cohesive. The exposed end or ends are bonded after coiling to form a band. The band may be readily opened by manually transversely tearing or by manually peeling the sealed end or ends. The strips of substrate may be of different materials and the water borne bonding agents may be different to achieve different properties in the resulting band. The coatings may be curable by air drying, heat drying or chemical content to vary the bonding properties of the coatings.

10 Claims, 2 Drawing Sheets

LAP SEAL PACKAGING BAND

BACKGROUND OF THE INVENTION

This application is a continuation-in-part of my co-pending application Ser. No. 07/695,456 filed May 3, 1991, now abandoned.

The present invention relates to lap seal packaging bands used to bundle, secure, contain or wrap items with the intent that the items can be easily separated from the band by by removing the band from the items by tearing the bands or by peeling the sealed ends of the band apart.

In the past lap seal bands have been formed by taking an elongated strip of flexible material called substrate and applying a cohesive, organic solvent borne pressure sensitive bonding agent to an elongated portion of one face of the substrate adjacent one longitudinal edge and applying the cohesive pressure sensitive bonding agent to an elongated portion of the other face of the substrate adjacent the other longitudinal edge and then cutting the substrate transversely to form the band.

While this manner of forming a band enables the manufacturer to vary the width of the resulting band as desired, the band length is limited to the overall width of the strip. This manner of forming the band has the unique advantage that the cohesive portion of the band never comes in contact with the material being bundled thereby contaminating the material. Such bands are usually formed from a non-woven substrate such as paper and thus there are several inherent disadvantages. When the surfaces are coated with water born pressure sensitive bonding agents they will tend to curl when the same are cut latitudinally from the strip. Pressure sensitive water or solvent borne adhesive agents cannot be used because the exposed surfaces will tend to stick to anything with which the strip comes in contact. This makes pre-cutting and stacking of bands impossible due to curling and sticking.

On the other hand it is desirable to use a paper or other substrate material that will make it possible for the user to manually readily tear or rend the band transversely. In the alternative or as an additional detachment possibility to treat the band surfaces to be joined with a pressure sensitive adhesive or cohesive that will allow the overlapped layers of the band to be manually peeled apart, particularly without damage to the ability to reseal the band at a later desired time.

Bands formed according to the prior art also created an environmental hazard as the solvents used to bear the cohesive are organic. These create hazardous conditions at the point of manufacture in the form of air pollutants.

SUMMARY OF THE INVENTION

Prior to proceeding with this application it would be well advised to set out certain definitions that will apply as this application proceeds. First the word "adhesive" as herein used will mean a pressure sensitive bonding agent applied to the substrate that will stick to virtually all types of surface. "Cohesive" as used herein is intended to specify a pressure sensitive bonding agent applied to the substrate that will stick only to another surface treated with the same agent or an agent that will work complementarily therewith in a bonding manner.

It is an object of the present invention to provide a lap seal packaging band using water based cohesives or adhesives, the band formed in such a manner to eliminate the curling and sticking problems of the prior art.

It is another object of the present invention to form a substrate for a longitudinally elongated lap seal packaging band by overlying one of two elongated strips cut off in preselected desirable lengths, by the other of said strips, in a longitudinally offset fashion, at least one strip having an exposed end and that strip coated with a water based pressure sensitive adhesive bonding agent.

It is still another object of the present invention to provide a lap seal packaging band substantially as above described wherein the two strips are of substantially equal lengths but longitudinally offset to leave exposed ends on each strip.

It is yet another object of the present invention to provide a lap seal packaging band of the types above described wherein the resulting band is biodegradeable and uses no ecologically undesirable solvents, particularly of the organic type that foul the atmosphere.

It is yet another object of the present invention to provide a lap seal band substantially as above describes wherein the substrate is paper or other readily manually transversely tearable material.

It is a further object of the present invention to provide a lap seal packaging band of the character above described wherein the exposed ends of the two strips are both coated with a water based cohesive agent.

It is still a further object of the present invention to provide a lap seal packaging band of the character above described wherein the downwardly facing surface end of the overlying strip and the upwardly facing surface of the of the overlaid strip are coated with a water based cohesive agent and the strips are transversely aligned and longitudinally offset.

It is yet a further object of the present invention to provide in a lap seal packaging band as above described at least two strips having facing surfaces, one facing surface of one strip having one of the variety of water based pressure sensitive bonding agents known as an adhesive and the other facing surface of the other strip having one of the variety of water based pressure sensitive bonding agents known as a cohesive.

It is moreover, a further object of the present invention to form a lap seal band from substrates of different materials varying the properties of the resulting band, such as the ease with which the band may be manually readily rent or torn transversely or peeled apart.

It is finally a further object of the present invention to provide a lap seal band of the character above described wherein the adhesives and cohesives used are water based and allow the user to readily manually peel the overlying surfaces away from each other either with or without removing the adhesive or cohesive from the surface to which it was originally applied.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
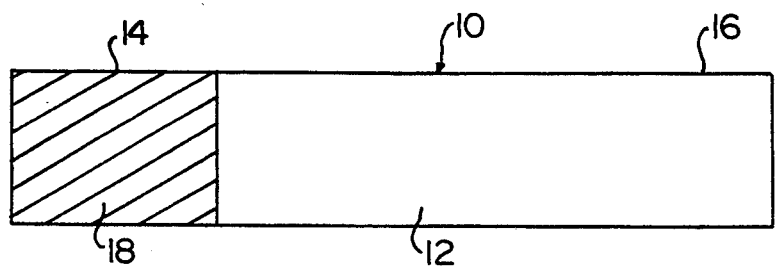
FIG. 1 is a top plan view of a lap seal band as known in the prior art.
Figure 2:
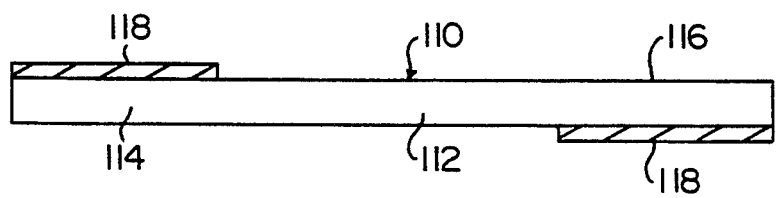
FIG. 2 is a side elevational view of the band shown in FIG. 1 showing another optional version.
Figure 3:
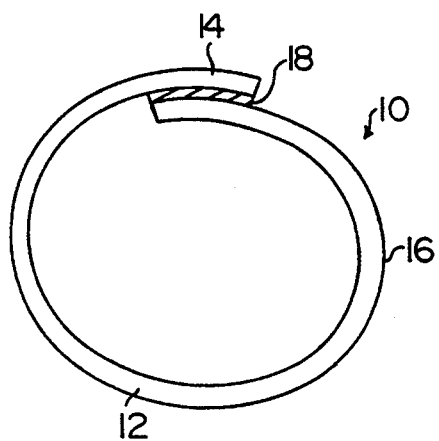
FIG. 3 is a ring band formed from the structure shown in FIG. 1.

Referring now to the drawings and particularly to FIGS. 1 and 3 thereof a lap seal packaging band is disclosed, generally identified by the numeral 10. Band 10 is formed from a generally elongated strip identified by the numeral 12. Note that in FIGS. 1 and 3 the prior art was practiced by the use of one elongated strip or substrate. Strip or substrate 12 is generally divided into a first portion 14 and and a second portion 16. The upper portion of portion 14 is treated with an adhesive bonding agent identified by the numeral 18. The downwardly facing surface of portion 16 is un-treated but can be turned as shown in FIG. 2 to form an untwisted loop with the upwardly facing surface of portion 14 sticking to the downwardly facing surface of portion 16. The surface treatment of portion 14 could be changed to the downwardly facing surface and the upper surface of portion 16 joined to the downwardly facing surface of portion 14 accomplishing the loop in a reverse fashion if desired.

Figure 4:
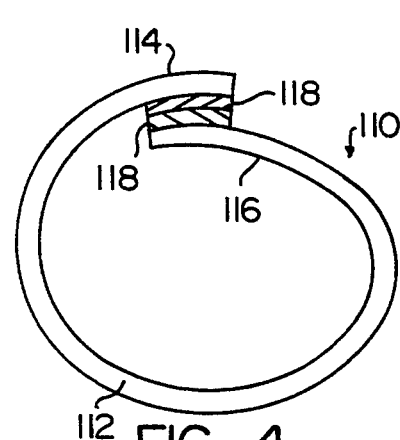
FIG. 4, is a view similar to FIG. 3 but showing a band formed from the structure shown in FIG. 2.

Your attention is now directed to FIGS. 2 and 4 in which a lap seal packaging band is disclosed generally identified by the numeral 110, the band being formed from a non-woven substrate such as paper. All similar structure in FIGS. 2 and 4 to FIGS. 1 and 3 are designated by similar numbers in the 100 series. Note that in place of adhesive 18 the surface 114 is coated with a cohesive substance 118 as is the downwardly facing surface of portion 116. Thus when the surfaces are brought into contact they will stick together but in the meantime neither surface will stick to any material un-coated with the cohesive substance 118. Referring now to FIG. 4, it can be seen how the band is formed.

Figure 5:
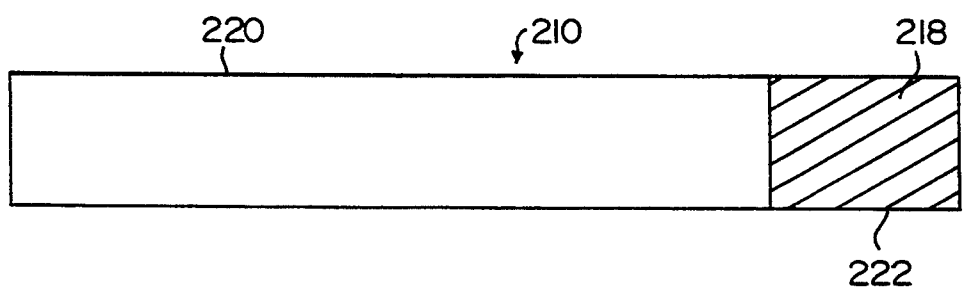
FIG. 5 is a top plan view of a band formed according to the present invention.
Figure 6:
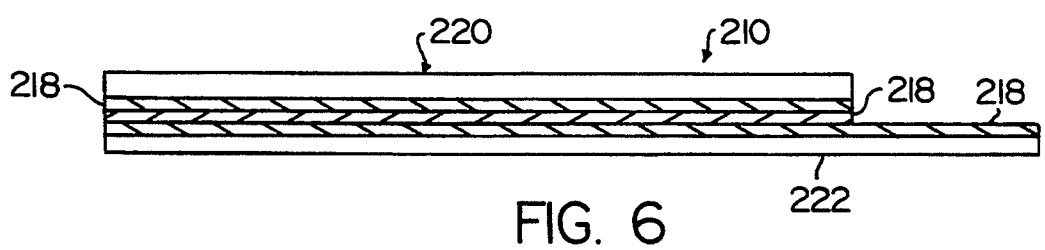
FIG. 6 is a side elevational view of the band shown in FIG. 5.

Referring now to FIGS. 5 and 6 of the drawings, an embodiment of the present invention is disclosed wherein the band is generally identified by the numeral 210. In this embodiment the band 210 is formed from two strips of non-woven substrate such as paper, the upper strip numbered 220 and the lower strip numbered 222. In the embodiment shown in FIGS. 5 and 6, the strips 220 and 222 are both elongated, the same width but of different lengths. This construction is such that either the upper surface of strip 222 and the lower surface of strip 220 or just the upper surface of strip 222 can be coated with a water based adhesive 218. The strips 220 and 222 may then be placed even at one end of each strip 220 and 222. The adhesive will join the facing surfaces of the strips but the strip 222 is longer and will have a portion 218 at one end coated with water based adhesive so that the strips may be formed into a packaging band as shown in FIG. 7.

Figure 7:
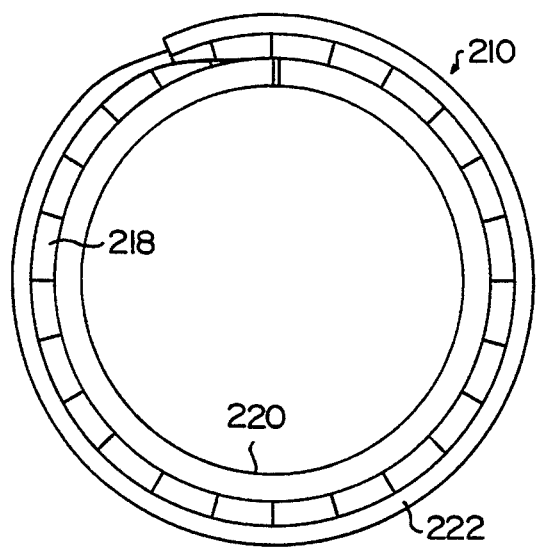
FIG. 7 is a ring band formed from the structure shown in FIG. 5 and FIG. 6.
Figure 8:
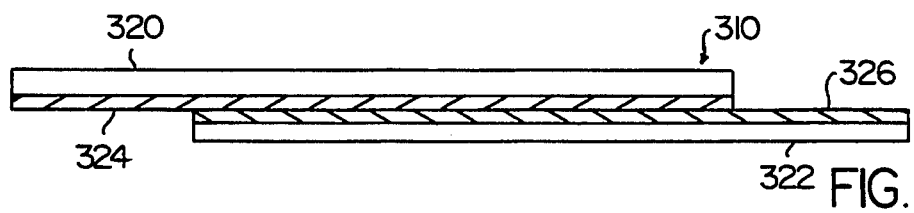
FIG. 8 is a side elevational view of another optional version of the embodiment shown in FIGS. 5, 6 and 7.
Figure 9:
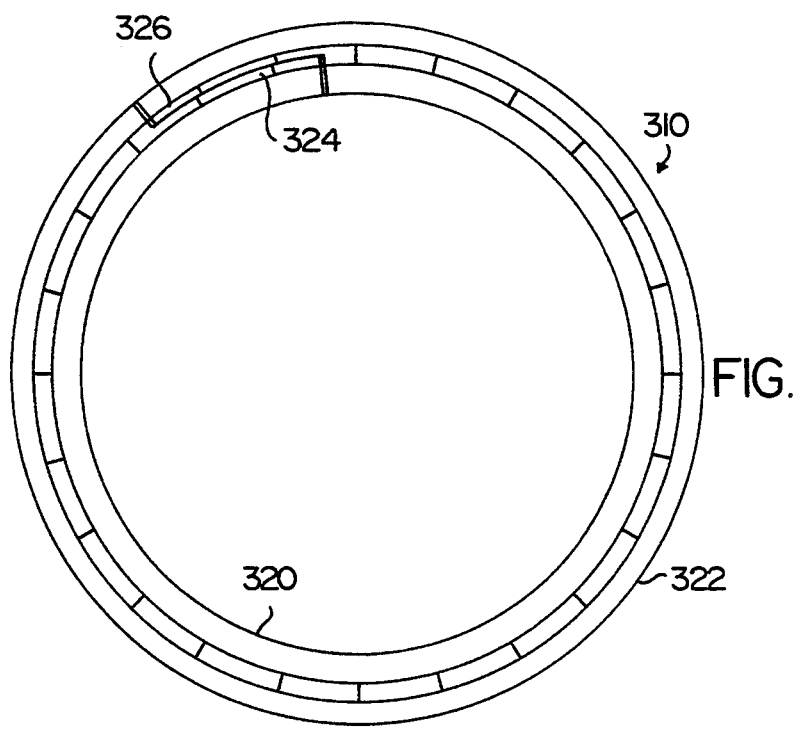
FIG. 9 is a ring band formed from the optional version shown in FIG. 8.

Referring now to FIGS. 8 and 9 of the drawings another version of the embodiment shown in FIGS. 5, 6 and 7 is disclosed with similar structure given similar numbers but in the 300 series. In the embodiment shown in FIGS. 8 and 9, the strips 320 and 322 are both elongated, are both the same width and length, and both formed from a non-woven substrate such as paper. Both the downwardly facing surface of strip 320 and the upwardly facing surface of strip 322 have a water based bonding substance applied thereto numbered 324 and 326 respectively. Note that in this embodiment of the invention the strips 320 and 322 are longitudinally offset such that there is exposed a substance coated portion 324 of strip 320 and a substance coated portion 326 of of strip 322. It can easily be seen that strip 320 can be longitudinally offset relative to strip 322 and then positioned thereover. As can be seen from FIG. 9 of the drawings the two exposed ends may then be overlaid so that their exposed surfaces 324 and 326 may be joined to complete the band.

Figure 10:
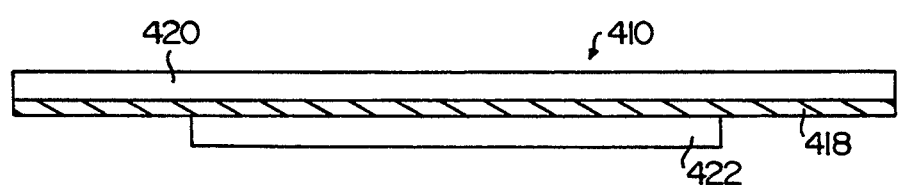
FIG. 10 is a side elevational view of another embodiment of the present invention.

Referring now to FIG. 10 of the drawings a lap seal packaging band is disclosed generally identified by the numeral 410. All similar structure in FIG. 10 to that disclosed in FIGS. 1 through 9 is numbered in the 400 series. Upper strip 420 has a downwardly facing surface coated with a water based adhesive substance 418. The upper surface of lower strip 422 as shown in FIG. 10 is adhesively joined to the lower surface of upper strip 420 by the adhesive 418, but note also that strip 420 is longer than strip 422 such that exposed water based adhesively coated portions of the lower surface of strip 420 are left exposed at both ends of strip 420. Both strips 420 and 422 are made from a non-woven substrate. Thus it can be seen that lap seal packaging band 410 may be curled into a circle and the exposed end joined. The advantage of this construction is that an exposed adhesive treated surface is left internally exposed when a ring is formed thereby making it possible to attach the ring to the packaged goods if desired. Also, if the curl into a ring is reversed, an adhesively treated surface will be exposed on the exterior of the ring to allow the ring to be externally attached to another item.

An advantage of the two strip substrate such as previously described herein is that each coated strip may be stored in long roll form and dispensed by appropriate structure to select desired lengths of each strip from an infinite variety of possible lengths.

A feature of applicants structure is that the ends joined to form the band need not be abutting allowing length adjustment within the pre-selected lengths determined by the cutting.

In stating the objects of the invention applicant talked about separating of the formed band not only by tearing but also by peeling. This may be accomplished by reason of the fact that pressure sensitive bonding agents, of which there are a great many, may be selected and coated on a strip creating a bond with the strip that is greater in strength than any bond the agent may subsequently form with another strip or another bonding agent. The simple passage of time by exposure to the air is sometimes sufficient to cure the coated strip so as to establish this bond but at times it may be necessary to chemically or heat cure the bonding agent and coated strip to form the desired strength of bond. The strength of the bonding agent selected and the bond formed with the strip is directly related to the tensile strength of the strip. For example the bond formed between a coated strip and a non-coated strip may be such that the coated strip may be torn or peeled longitudinally away from the other strip taking some of the surface material of the other strip.

I claim:

1. A removable lap seal band comprising:
   a) a first elongated strip;
   b) a second elongated strip;
   c) said strips at least partially overlying each other in a longitudinally offset manner, at least one of said strips of a non-woven material;
   d) a surface of at least one of said strips which faces the other of said strips coated with a water borne pressure sensitive bonding agent;
   e) a combination of said strips and said coating forming a manually rendable packaging band substrate.

2. The structure as set forth in claim 1, wherein said two strips overly each other in longitudinally offset fashion such that both strips have an exposed end.

3. The structure as set forth in claim 2, wherein both of said strips are coated with a water borne pressure sensitive cohesive bonding agent.

4. The structure as set forth in claim 1, wherein both of said strips are of a manually readily rendable non-woven material.

5. The structure as set forth in claim 1, wherein both of said strips are coated with water borne adhesive pressure sensitive bonding agents.

6. The structure as set forth in claim 1, wherein both of said strips are equally long and at least one is coated with a water borne pressure sensitive adhesive bonding agent.

7. The structure as set forth in claim 1, wherein one of said strips is coated with a water borne pressure sensitive adhesive bonding agent and the other of said strips is coated with a water borned pressure sensitive cohesive bonding agent.

8. The structure as set forth in claim 1, wherein one of said strips is shorter than the other of said strips and the other of said strips overlays said one of said strips such that said other of said strips has two exposed ends and said other of said strips is coated with a pressure sensitive bonding agent whereby when coiled one of said exposed ends bonds to the uncoated surface of the other of said strips and the other of said exposed ends faces inwardly for bonding with a packaged product.

9. The structure as set forth in claim 8, wherein when the said strips are coiled in reverse fashion one of said exposed ends bonds to the uncoated surface of the other of said strips and the other of said exposed ends faces outwardly for bonding with another object.

10. The structure as set forth in claim 1, wherein said two strips forming said substrate are of different materials having different structural characteristics.

* * * * *